ial Staff# UNITED STATES PATENT OFFICE.

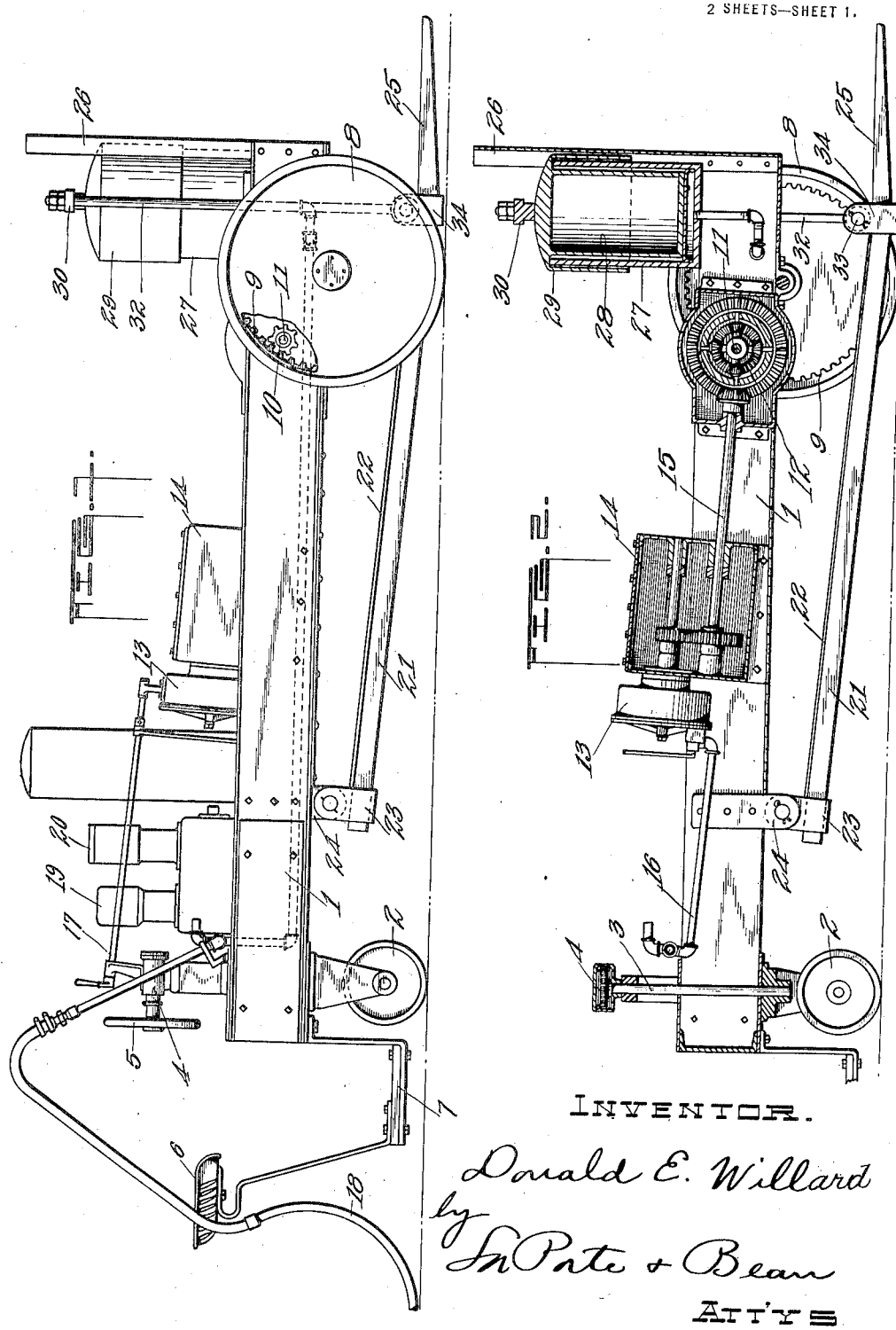

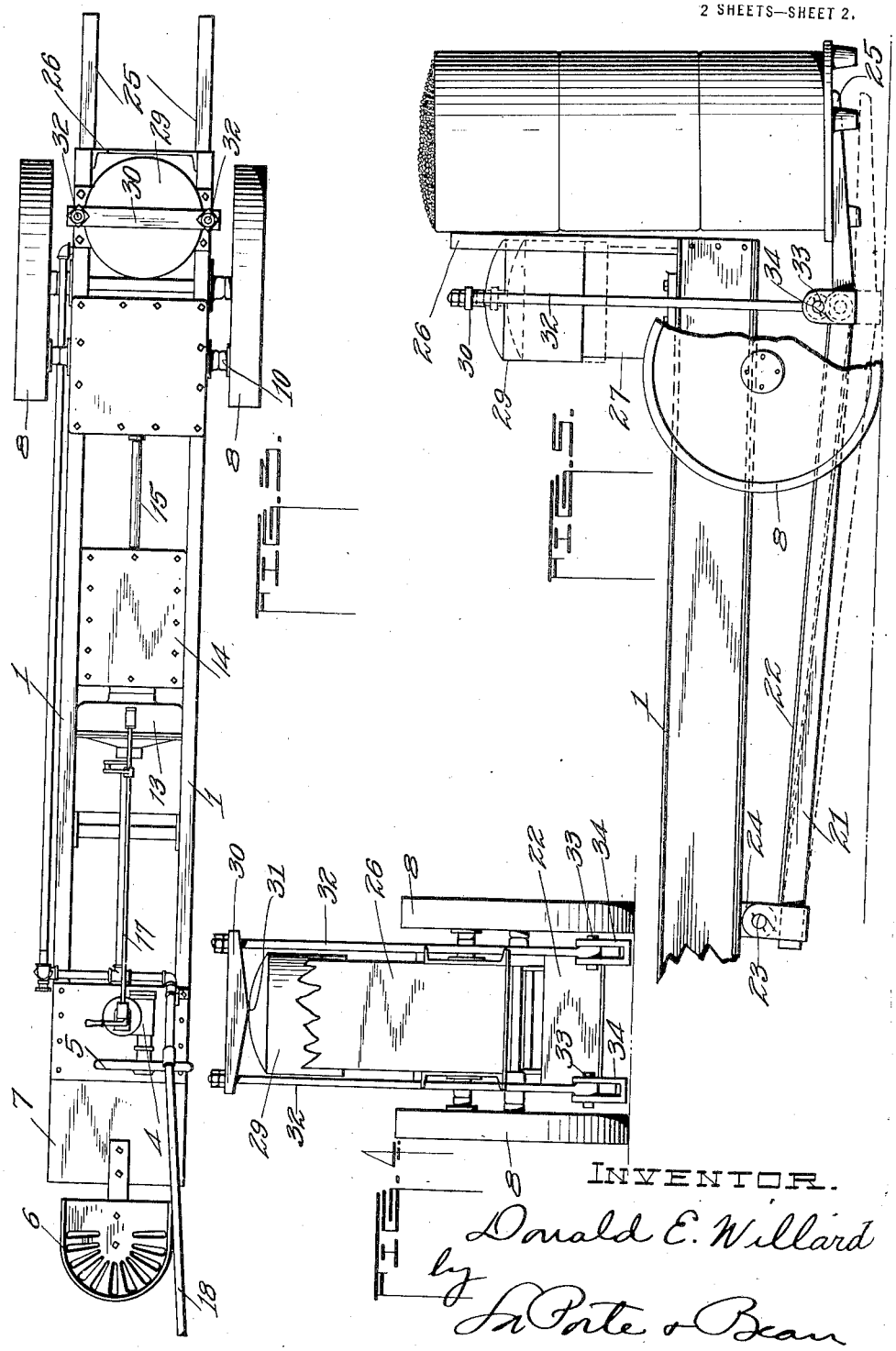

DONALD E. WILLARD, OF DECATUR, ILLINOIS.

CHARGING TRUCK.

1,411,652.

Specification of Letters Patent.

Patented Apr. 4, 1922.

Application filed December 11, 1917. Serial No. 206,630.

*To all whom it may concern:*

Be it known that I, DONALD E. WILLARD, a citizen of the United States, a resident of Decatur, in the county of Macon and State of Illinois, have invented new and useful Improvements in Charging Trucks, of which the following is a specification.

My invention relates to improvements in trucks, and particularly a charging truck designed for use in charging annealing furnaces.

The principal object of this invention is to provide a truck of this character which is simple and strong in construction, and readily and efficiently operated, having simple controlling means for operation, not requiring the services of a skilled mechanic for operation.

Another object of this invention is the provision of such a truck which is driven by compressed air and in which the lifting of the flasks or boxes is accomplished by means of compressed air, the control of this power being simple and convenient.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which show merely for the purpose of illustrative disclosure, a preferred embodiment of my invention, it being understood that various changes may be made in practice within the scope of the claims without digressing from my inventive ideas.

In the drawings,

Figure 1 represents a side elevation of a mechanism constructed according to my invention;

Figure 2 is a vertical longitudinal section through the same;

Figure 3 is a top plan view of the same;

Figure 4 is an end view of the same, part of the vertical back or supporting plate being broken away to show the connection between the lifting mechanism and the rods leading to the lifting frame, and Figure 5 is a side elevation of the front or operating portion of the machine, the upper position of the lifting frame and charge being shown in full lines, and the lower position of the same in dotted lines.

Referring now to the drawings, the main frame of the machine comprises the longitudinal channel bars 1, which are spaced apart as shown, so as to support thereon and therebetween, the various operating parts of the mechanism.

This main frame is supported at the rear on the steering wheel or caster 2 from which the shaft 3 extends upwardly to the steering mechanism 4, having the operating wheel 5 in convenient position to the operator's seat 6, which is mounted on the platform 7 connected to the rear end of the main frame. The front portion of the main frame is suitably supported by the pair of drive wheels 8. These drive wheels are each provided with the internal rack or gear 9 with which the pinions 10 on the end of shafts 11 leading from the differential 12, engage. This differential may be of any standard form of construction and is driven from the air motor 13 through the transmission 14 and drive shaft 15, as is obvious from a consideration of the drawings. This air motor has a suitable connection by means of pipe 16, to a source of air supply and is controlled by the operating lever or throttle 17.

I show the connection 18 leading to an outside source of supply of compressed air, and also the internal combustion motor 19 and compressor 20 mounted on the frame so that the power may be supplied entirely by mechanism on the machine; that is, the machine may carry its own power plant and not require the use of hose or other connection to an outside source of power.

The lifting frame comprises the pair of bars 21 spaced apart and connected by the cover plate 22 so as to form a single structure. The rear ends of these bars are mounted in the yoke members 23 which are pivoted to the arms or brackets 24 depending from the members 1 of the main frame. These bars 21 are straight for the greater portion of their length, but their outer or engaging end portions are bent at a slight angle thereto, so that the outer portions 25 will assume a horizontal position when the lifting frame is lowered, and will slightly incline the load or charge toward the supporting back or plate 26, when the lifting frame is lifted, as shown clearly in Figure 5. This supporting back or plate 26 is secured between the ends of the members 1 of the main frame.

The means for lifting the lifting frame includes the cylinder 27 mounted on the main frame having the piston member 28 mounted therein connected with the hood or cap 29, the top of which is rounded, as shown. Loosely and pivotally mounted on this cap 29 of the piston member 28, is the cross-bar or beam 30, the lower surfaces of which are inclined, converging to a point 31 which rests on top of the cap 29 and forms a pivot on which the bar or beam 30 may be swung or oscillated. Rods 32 are secured to each side of this bar or beam 30 and extend downwardly along the outside of the main frame, having their lower ends each formed with an eye to receive the pin 33 which connects the yoke member 34 thereto, the lifting bar 21 resting loosely in this yoke 34 at or about the point at which the bend in the lifting bar occurs.

It is to be noted that the piston member 28 is provided with an ordinary cup washer at the bottom. The head 29 forms a dust covering for the cylinder construction. By using the cover or connecting plate 22 between the bars 21, any irregularity in lifting or tilting the arms or frame is prevented. The stands or boxes which are supported on the lifting arms are very irregular and easily tilted. In case of accident to either of the lifting bars, it may be readily replaced, due to the structure.

The operation of this device is readily understood from a consideration of the drawings in connection with this description. The engaging portion is positioned under the charge of the annealing boxes or flasks and the compressed fluid admitted to the cylinder 27, so that the lifting frame raises and holds the charge in the position shown in Figure 5. The compressed fluid is admitted to the motor so as to drive the same in the proper direction and the charge transported.

The operation is exceedingly simple, the control of the travel of the machine and of the lifting frame is simple and efficient. The structure is entirely simple so that the operator has an unobstructed view over the machine so as to obviate the possibility of accident, due to collision and the like.

The self contained power plant is another obvious advantageous feature, rendering this device practical for its special, as well as many other purposes.

What I claim is:

1. A mechanism of the character described, including in combination, a portable truck construction and means for driving said truck, a lifting frame pivotally mounted on said truck, said lifting frame comprising a pair of elongated bars and a plate connecting them, the forward or engaging end portions of said bars being bent at a slight angle to the remaining portions of the bars, a supporting back or plate secured to the front end of said truck, means for raising and lowering said lifting frame, the elongated bars of said lifting frame being so arranged that when the lifting frame is in its lowered position, the forward or engaging end portions thereof, will assume a substantially horizontal position, and when the lifting frame is raised, the load on the forward or engaging ends of the bars will be slightly tilted so as to rest against said supporting back or plate, said lifting means comprising an air cylinder and piston construction, a cross-beam connected to said piston, and rods connecting said cross-beam to said elongated bars on the lifting frame.

2. A mechanism of the character described, including in combination, a portable truck construction and means for driving said truck, a lifting frame pivotally mounted on said truck, said lifting frame comprising a pair of elongated bars and a plate connecting them, the forward or engaging end portions of said bars being bent at a slight angle to the remaining portions of the bars, a supporting back or plate secured to the front end of said truck, means for raising and lowering said lifting frame, the elongated bars of said lifting frame being so arranged that when the lifting frame is in its lowered position, the forward or engaging end portions thereof, will assume a substantially horizontal position, and when the lifting frame is raised, the load on the forward or engaging ends of the bars will be slightly tilted so as to rest against said supporting back or plate, said lifting means comprising an air cylinder and piston construction, said piston having a rounded cap portion, a cross-beam having a pivotal point on its under side resting on said rounded cap, a rod connected near each end of said cross-beam and extending downwardly to said elongated bars of said lifting frame.

In witness whereof, I have hereunto affixed my hand this 3rd day of December, 1917.

DONALD E. WILLARD.